United States Patent
Kohashi

(10) Patent No.: US 7,197,581 B2
(45) Date of Patent: Mar. 27, 2007

(54) INTEGRATED CIRCUIT, DEVICE AND METHOD FOR INPUTTING/OUTPUTTING IMAGES

(75) Inventor: Yasuo Kohashi, Kasuya-Gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 530 days.

(21) Appl. No.: 10/821,931

(22) Filed: Apr. 12, 2004

(65) Prior Publication Data

US 2004/0225759 A1    Nov. 11, 2004

(30) Foreign Application Priority Data

Apr. 21, 2003   (JP) .............................. 2003-116050

(51) Int. Cl.
*G06F 13/28* (2006.01)
*G06F 13/14* (2006.01)
*G06F 13/36* (2006.01)

(52) U.S. Cl. .................... 710/28; 710/22; 710/305; 710/306; 710/308

(58) Field of Classification Search .............. None
See application file for complete search history.

(56) References Cited

U.S. PATENT DOCUMENTS

| 5,941,968 A | 8/1999 | Mergard et al. ............ 710/128 |
| 6,754,724 B2* | 6/2004 | Horikawa et al. ............. 710/8 |
| 2003/0084226 A1* | 5/2003 | Barrenscheen et al. ..... 710/305 |

FOREIGN PATENT DOCUMENTS

JP   2002-10277   1/2002

* cited by examiner

*Primary Examiner*—Fritz Fleming
*Assistant Examiner*—Richard B. Franklin
(74) *Attorney, Agent, or Firm*—Wenderoth, Lind & Ponack, L.L.P.

(57) ABSTRACT

The integrated circuit comprises, in addition to a first bus and a first DMA controller, a second bus and a second DMA controller that mutually connects the first bus and the second bus. A main memory is connected to the first bus, and a frame memory is connected to the second bus.

By the construction, a possible conflict in data transfer as "urgent processing" and as "normal processing" can be avoided. The data transfer as "urgent processing" includes transferring image data between the frame memory and an image input device or an image display device; while the data transfer as "normal processing" includes transferring image data between the main memory and the frame memory.

13 Claims, 11 Drawing Sheets

INTEGRATED CIRCUIT, DEVICE AND METHOD FOR INPUTTING/OUTPUTTING IMAGES

BACKGROUND OF THE INVENTION

1. Field of the Invention

The present invention relates to an integrated circuit, a device and a method for inputting/outputting images, in particular, the present invention relates to the improvement of an art to avoid data conflict at the time of data transfer among a plurality of memories in a case where the integrated circuit possesses a plurality of DMA (Direct Memory Access) controllers.

2. Description of the Related Art

In recent years, a system LSI (Large Scale Integrated Circuit) that possesses in itself a processor for controlling programs and an integrated circuit for image input/output units has been developed, due to advanced semiconductor processing using thinner lines.

FIG. 10 is a block diagram illustrating a system LSI 1 for image processing and an image input/output device utilizing the system LSI 1, according to an prior art.

In FIG. 10, the system LSI 1 comprises with a bus 2, a processor 3 (that may be substituted by a plurality of processors in some cases) connected with the bus 2, a DMA controller 6, an image input unit 8 and an image output unit 9. The image input unit 8 possesses a synchronizing signal detector 10 and an input buffer memory 11, while the image output unit 9 possesses a synchronizing signal generator 12 and an output buffer memory 13.

A main memory 4 and a non-volatile memory 5 are connected with the bus 2 of the system LSI 1. An image input device 14 such as a CCD camera is connected with the image input unit 8, while an image display device 15 such as a liquid crystal display is connected with the image output unit 9.

The processor 3 controls the image input/output device by reading and executing programs stored in the non-volatile memory 5. One example of the control will be described below.

In FIG. 10, an image input signal from the image input device 14 is inputted into the synchronizing signal detector 10 in the image input unit 8. In the synchronizing signal detector 10, a synchronizing signal is detected, and at the same time, effective image data that is an image signal effective in displaying is extracted and temporarily stored in the input buffer memory 11.

The effective image data temporarily stored in the input buffer memory 11 is transferred via the bus 2 and stored into the main memory 4. Then necessary processing such as compressing the image, expanding the image, etc. will be performed by the processor 3. Such processed effective image data is again stored in the main memory 4 via the bus 2.

The effective image data stored in the main memory 4 is sent to and stored temporarily in the output buffer memory 13 of the image output unit 9. The effective image data read from the output buffer memory 13 is combined with a synchronizing signal in the synchronizing signal generator 12. The synchronizing signal combined effective image data is then sent to the image display device 15 to be displayed.

At this time, the DMA controller 6 controls to transfer data via the bus 2; the data to be read from and/or to be stored in the main memory 4, the non-volatile memory 5, the input buffer memory 11, and the output buffer memory 13.

One example of such operations will be described in more detail with reference to FIG. 10 and FIG. 11.

FIG. 11 is a chart exemplifying DMA timing of a system LSI for image processing according to the prior art. As shown in FIG. 11, effective image data 21 is extracted and generated continuously in the image input unit 8 at a non-blanking period of a vertical synchronizing signal 20, from the image input signal inputted from the image input device 14 shown in FIG. 10. Thereafter the effective image data 21 is temporarily stored in the input buffer memory 11. The effective image data 21 temporarily stored in the input buffer memory 11 is to be transferred to the main memory 4 continuously at the predetermined time, for example, synchronizing with a horizontal synchronizing signal. At this time, upon receipt of a request from the image input unit 8 to transfer the effective image data 21 to the main memory 4, the DMA controller 6 operates so that the effective image data is transferred at top priority while interrupting processing of lower priority.

When displaying on the image display device 15 the image data that has been processed and stored in the main memory 4, the DMA controller 6 transfers the effective image data 23 to the output buffer memory 13 from the main memory 4 at top priority at the predetermined time continuously, for example, synchronizing with a horizontal synchronizing signal at a non-blanking period of a vertical synchronizing signal 22 as shown in FIG. 11.

Thus, the image data transfer from the input buffer memory 11 to the main memory 4 and the image data transfer from the main memory 4 to the output buffer memory 13 are both processed at top priority with interrupting the processing of lower priority. At this time, the DMA controller 6 arbitrates according to the timing scheduled beforehand so that such image data transfer may not conflict with other data transfer in the bus 2.

The processing of data transfer at the predetermined time at top priority as described above is called "urgent processing", while other processing of data transfer, for example, between the processor 3 and the main memory 4 when processing image such as image compressing and image expanding, is called "normal processing".

A main memory path occupancy state chart 24 shown in FIG. 11 indicates an example of scheduling by the DMA controller 6. In this example, image data is transferred alternately as "urgent processing" at the predetermined time in the continuous order that a (J) line of an (M) frame to the image output unit 9, an (I) line of an (N) frame from the image input unit 8, a (J+1) line of the (M) frame to the image output unit 9, and an (I+1) line of the (N) frame from the image input unit 8, while other process by the processor 3 is performed as "normal processing".

A part 25 of the main memory path occupancy state chart 24 in FIG. 11 is enlarged in FIG. 12. That is, FIG. 12 shows an enlarged chart of DMA timing of the system LSI 1 for image processing according to the prior art. This figure shows timing in scheduling the main memory path occupancy state. In the example shown in FIG. 12, a first DMA processing 26 of the processor 3 as "normal processing" is interrupted, and a DMA processing 27 of a (J+1) line and a DMA processing 28 of an (I) line as "urgent processing" are performed. Thereafter a first DMA processing 29 of the processor 3 as "normal processing" is resumed, and then a second DMA processing 30 of the processor 3 as "normal processing" is performed successively.

The first DMA processing 26 of the processor 3 is first data transfer processing between the processor 3 and the main memory 4. The DMA processing 28 of the (I) line is the data transfer processing of the (I) line of the (N) frame from the input buffer memory 11 to the main memory 4. The DMA processing 27 of the (J+1) line is the data transfer processing of the (J+1) line of the (M) frame from the main memory 4 to the output buffer memory 13. Other parts of the main memory path occupancy state chart 24 will be understood in a similar way.

Controlling the interruption and the resumption of the normal processing mentioned above is performed by a DMA interruption/resumption control unit 7 of the DMA controller 6 shown in FIG. 10.

There are some problems in the image processing system according to the prior art described above.

First, since both image data urgently processed and image data normally processed share the single main memory 4, conflict of data transfer on the bus 2 occurs frequently. In order to avoid this situation, precise scheduling of the DMA is necessary, which makes design of the DMA scheduling complicated.

Secondly, a controlling mechanism to interrupt and resume the normal processing is necessary, which makes a circuit of the DMA controller 6 complicated.

Thirdly, the normal processing is often interrupted and hence delayed.

Fourthly, the conventional system LSI 1 having a fixed image input unit 10 and a fixed image output unit 9 can not be flexibly connected to an image input device 14 and an image display device 15 with different specifications, which lacks expandability. To meet such situations, it is necessary to develop a new system LSI having a synchronizing signal detector and a synchronizing signal generator with different specifications, which costs time and money.

OBJECTS AND SUMMARY OF THE INVENTION

An object of the present invention is to provide an integrated circuit, a device utilizing the integrated circuit and a method for inputting/outputting images that can avoid possible conflict in transferring data to be urgently processed and data to be normally processed, furthermore that can be connectable to an image input device with different specifications and an image display device with different specifications.

A first aspect of the present invention provides an integrated circuit comprising: a first bus; a processor operable to connect with the first bus; a first DMA controller operable to connect with the first bus; a second bus; a second DMA controller operable to mutually connect the first bus and the second bus; a first connecting unit comprising a first buffer memory and operable to connect with the second bus; and a second connecting unit comprising a second buffer memory and operable to connect with the second bus, wherein the first bus is further operable to connect with a first memory that is externally installed and accessible by the processor, the second bus is further operable to connect with a second memory that is externally installed, wherein the first DMA controller is operable to arbitrate data transfer between the first memory and the second memory, after requesting the second DMA controller, and wherein the second DMA controller is operable to arbitrate data transfer between the second memory and the first buffer memory and data transfer between the second memory and the second buffer memory.

With this structure, it is possible to separate processing with higher priority that needs "urgent processing" from processing with lower priority that is "normal processing"; thereby possible conflict of data transfer on the first bus can be avoided.

This feature leads to easier design of a DMA controller; therefore, a period needed for the development of the DMA controller will be shortened.

Furthermore, the first connecting unit and the second connecting unit are connectable to an external input device as well as an external output unit, which makes a wide use of the integrated circuit possible. That is, both connecting units can be used only for input or only for output, or one of the connecting units can be used for input and the other for output.

A second aspect of the present invention provides an integrated circuit as defined in the first aspect, wherein the second DMA comprises a DMA arbiter, a transfer output buffer memory and a transfer input buffer memory, wherein the DMA arbiter, upon receipt of data transfer request from the first connecting unit, arbitrates data transfer between the first buffer memory and the second memory via the second bus, wherein the DMA arbiter, upon receipt of data transfer request from the second connecting unit, arbitrates data transfer between the second buffer memory and the second memory via the second bus, wherein the DMA arbiter, upon receipt of data transfer request from the first DMA controller, arbitrates data transfer from the second memory to the first memory via the transfer output buffer memory, and wherein the DMA arbiter, upon receipt of data transfer request from the first DMA controller, arbitrates data transfer from the first memory to the second memory via the transfer input buffer memory.

With this structure, data transfer of input/output between an input/output device and the second memory can be processed only via the second bus without passing the first bus. Consequently, possible conflict of data transfer on the first bus is reduced, which accelerates processing by the processor utilizing the first memory.

Furthermore, the second DMA controller can make independently a scheduling in transferring the input/output data between the input/output device and the second memory, which makes a design of the integrated circuit more flexible and improves the efficiency in operation.

A third aspect of the present invention provides an integrated circuit as defined in the first aspect, wherein the first connecting unit further comprises a connecting circuit that interfaces an external device connected to the first connecting unit with the first buffer memory, and wherein the second connecting unit further comprises a connecting circuit that interfaces an external device connected to the second connecting unit with the second buffer memory.

With this structure, an interface with an externally connected input/output device is realized by the connecting circuits; thereby data transfer between the input/output device and the input buffer memory or between the input/output device and the output buffer memory is made easier and more efficient.

A fourth aspect of the present invention provides an integrated circuit as defined in the first aspect, wherein the connecting circuit of the first connecting unit and the connecting circuit of the second connecting unit are composed of an FPGA (Field Programmable Gate Array).

With this structure, corresponding to an externally connected device, the connecting circuits can be reconfigured so as to meet the specifications of the externally connected device, which makes a wide use of the integrated circuit possible, eventually reducing the cost.

A fifth aspect of the present invention provides an integrated circuit as defined in the third aspect, wherein the first connecting unit is an image input unit that includes a synchronizing signal detector as the connecting circuit, detects effective image data from an externally inputted image signal, and stores the effective image data to the first buffer memory, and wherein the second connecting unit is an image output unit that includes a synchronizing signal generator as the connecting circuit, generates image output signal by inserting a synchronizing signal to image data stored in the second buffer memory, and sends externally the image output signal.

This structure makes it possible to realize an exclusive integrated circuit that can input and output images.

A sixth aspect of the present invention provides an integrated circuit as defined in the first aspect, wherein the processor is substituted by a plurality of processors.

With this structure, a real time processing becomes possible even for a large amount of jobs such as image compressing or image expanding. Therefore, it becomes possible to improve efficiency and multi-functionality of the integrated circuit.

A seventh aspect of the present invention provides an image input/output device comprising: an integrated circuit; a first memory; and a second memory, the integrated circuit comprising: a first bus; a processor operable to connect with the first bus; a first DMA controller operable to connect with the first bus; a second bus; a second DMA controller operable to mutually connect the first bus and the second bus; a first connecting unit comprising a synchronizing signal detector and a first buffer memory and operable to connect with the second bus; and a second connecting unit comprising a synchronizing signal generator and a second buffer memory and operable to connect with the second bus, wherein the synchronizing signal detector of the first connecting unit detects effective image data from an externally inputted image signal, and stores the effective image data to the first buffer memory, wherein the synchronizing signal generator generates image output signal by inserting a synchronizing signal to image data stored in the second buffer memory, and sends externally the image output signal, the first memory being operable to connect with the first bus and accessible by the processor and the first DMA controller, and the second memory being operable to connect with the second bus and accessible by the second DMA controller, wherein the first DMA controller arbitrates data transfer between the first memory and the second memory, after requesting the second DMA controller, and wherein the second DMA controller arbitrates data transfer between the second memory and the first buffer memory and data transfer between the second memory and the second buffer memory.

This structure makes it possible to realize an image input/output device that incorporates as a system LSI the integrated circuit as defined in the first aspect.

An eighth aspect of the present invention provides an image input/output device as defined in the seventh aspect, wherein the second DMA comprises a DMA arbiter, a transfer output buffer memory and a transfer input buffer memory, wherein the DMA arbiter, upon receipt of data transfer request from the first connecting unit, arbitrates data transfer between the first buffer memory and the second memory via the second bus, wherein the DMA arbiter, upon receipt of data transfer request from the second connecting unit, arbitrates data transfer between the second buffer memory and the second memory via the second bus, wherein the DMA arbiter, upon receipt of data transfer request from the first DMA controller, arbitrates data transfer from the second memory to the first memory via the transfer output buffer memory, wherein the DMA arbiter, upon receipt of data transfer request from the first DMA controller, arbitrates data transfer from the first memory to the second memory via the transfer input buffer memory.

This structure makes it possible to realize an image input/output device that makes use of the feature of the integrated circuit as defined in the second aspect.

A ninth aspect of the present invention provides an image input/output device as defined in the seventh aspect, wherein the synchronizing signal detector of the first connecting unit and the synchronizing signal generator in the second connecting unit are respectively composed of an FPGA.

According to this structure, by reconfiguring the synchronizing signal detector and the synchronizing signal generator that interface with an external device, it is possible to easily realize a new image input/output device that is connectable to a camera or a display with different specifications. Therefore, the development period and cost of a new product can be shortened.

A tenth aspect of the present invention provides an image input/output device comprising: a first integrated circuit; a second integrated circuit; a first memory; and a second memory, the first integrated circuit comprising: a first bus; a processor operable to connect with the first bus; a first DMA controller operable to connect with the first bus; a second bus; a second DMA controller operable to mutually connect the first bus and the second bus; a first buffer memory operable to connect with the second bus; and a second buffer memory operable to connect with the second bus; the second integrated circuit comprising a synchronizing signal detector and a synchronizing signal generator; the first memory being operable to connect with the first bus and accessible by the processor and the first DMA controller; and the second memory operable to connect with the second bus and accessible by the second DMA controller, wherein the synchronizing signal detector and the first buffer memory are mutually connected to form a first connecting unit, wherein the synchronizing signal generator and the second buffer memory are mutually connected to form a second connecting unit, wherein the synchronizing signal detector detects effective image data from an externally inputted image signal, and stores the effective image data to the first buffer memory, wherein the synchronizing signal generator generates image output signal by inserting a synchronizing signal to image data stored in the second buffer memory, and sends externally the image output signal, wherein the first DMA controller arbitrates data transfer between the first memory and the second memory through the second DMA controller, wherein the second DMA controller arbitrates data transfer between the second memory and the first buffer memory and data transfer between the second memory and the second buffer memory.

With this structure, by changing only the integrated circuit that interfaces external devices, it is possible to easily realize a new input/output device that is connectable to a camera or a display with different specifications. Therefore, the development period and cost of a new product can be shortened.

An eleventh aspect of the present invention provides an image input/output device as defined in the seventh aspect, wherein the processor is substituted by a plurality of processors.

This structure allows an image input/output device to perform a higher speed processing and to provide more various functions.

A twelfth aspect of the present invention provides an image input/output method utilizing an image input/output device, the image input/output device including: a first bus; a processor operable to connect with the first bus; a first DMA controller operable to connect with the first bus; a second bus; a second DMA controller operable to mutually connect the first bus and the second bus; a first connecting unit including a synchronizing signal detector and a first buffer memory and operable to connect with the second bus; and a second connecting unit including a synchronizing signal generator and a second buffer memory and operable to connect with the second bus, a first memory connected to the first bus and accessible by the processor and the first DMA controller, and a second memory connected to the second bus and accessible by the second DMA controller, the image input/output method comprising: detecting effective image data from an externally inputted image signal by the synchronizing signal detector of the first connecting unit and storing the effective image data to the first buffer memory; generating image output signal by inserting a synchronizing signal to image data stored in the second buffer memory, and sending externally the image output signal; arbitrating, by the second DMA controller, data transfer between the second memory and the first buffer memory and data transfer between the second memory and the second buffer memory; and arbitrating, by the first DMA controller, data transfer between the first memory and the second memory through the second DMA controller.

According to the present method, an image input/output device that incorporates as a system LSI the integrated circuit as defined in the first aspect can be realized. The image input/output device can avoid possible conflict in data transfer and operate with higher efficiency.

A thirteenth aspect of the present invention provides an image input/output method utilizing an image input/output device, the image input/output device including: a first bus; a processor operable to connect with the first bus; a first DMA controller operable to connect with the first bus; a second bus; a second DMA controller including a DMA arbiter and a transfer output buffer memory and a transfer input buffer memory, the second DMA controller being operable to mutually connect the first bus and the second bus; a first connecting unit including a synchronizing signal detector and a first buffer memory and operable to connect with the second bus; and a second connecting unit including a synchronizing signal generator and a second buffer memory and operable to connect with the second bus, a first memory connected to the first bus and accessible by the processor and the first DMA controller, and a second memory connected to the second bus and accessible by the second DMA controller, the image input/output method comprising: arbitrating, by the DMA arbiter upon receipt of data transfer request from the first connecting unit, data transfer between the first buffer memory and the second memory via the second bus; arbitrating, by the DMA arbiter upon receipt of data transfer request from the second connecting unit, data transfer between the second buffer memory and the second memory via the second bus; arbitrating, by the DMA arbiter upon receipt of data transfer request from the first DMA controller, data transfer from the second memory to the first memory via the transfer output buffer memory; and arbitrating, by the DMA arbiter upon receipt of data transfer request from the first DMA controller, data transfer from the first memory to the second memory via the transfer input buffer memory.

According to the present method, it is possible to realize an image input/output device having the same feature as the image input/output device as defined in the eighth aspect.

The above, and other objects, features and advantages of the present invention will become apparent from the following description read in conjunction with the accompanying drawings, in that like reference numerals designate the same elements.

DETAILED DESCRIPTION OF THE PREFERRED EMBODIMENTS

Preferred embodiments of the present invention are now described in conjunction with the accompanying drawing.

(First Embodiment)

Figure 1:
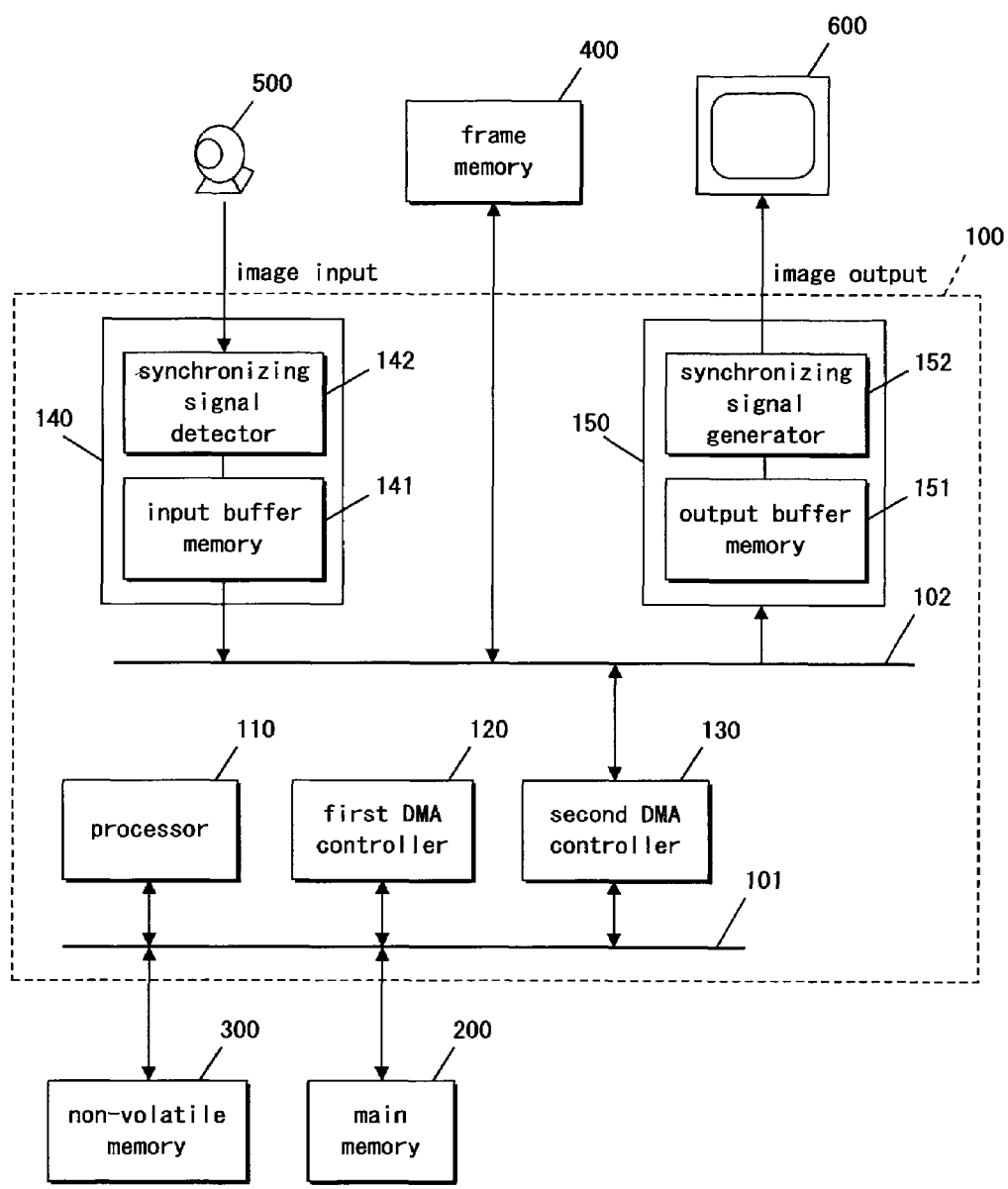
FIG. 1 is a block diagram illustrating an image input/output device according to a first embodiment of the present invention.

FIG. 1 is a block diagram illustrating an image input/output device according to a first embodiment of the present invention. The image input/output device according to the present embodiment comprises an integrated circuit 100, a main memory 200, a non-volatile memory 300, and a frame memory 400, wherein a camera 500 and a display 600 are connected as external devices.

According to the present embodiment, the main memory 200 is equivalent to a first memory, and the frame memory 400 is equivalent to a second memory.

As shown in FIG. 1, the integrated circuit 100 comprises a first bus 101, a second bus 102, a processor 110, a first DMA controller 120, a second DMA controller 130 that mutually connects the first bus 101 and the second bus 102, an image input unit 140, and an image output unit 150. The image input unit 140 includes a synchronizing signal detector 142 and an input buffer memory 141, and the image output unit 150 includes a synchronizing signal generator 152 and an output buffer memory 151. The processor 110 and the first DMA controller 120 are connected with the first bus 101, and the image input unit 140 and the image output unit 150 are connected with the second bus 102.

The main memory 200 and the non-volatile memory 300 are connected with the first bus 101 of the integrated circuit 100, and the frame memory 400 is connected with the second bus 102 of the integrated circuit 100. The camera 500 is connected with the synchronizing signal detector 142 of the image input unit 140 and the display 600 is connected with the synchronizing signal generator 152 of the image output unit 150.

According to the present invention, the image input unit 140 is equivalent to a first connecting unit, and the image output unit 150 is equivalent to a second connecting unit. The synchronizing signal detector 142 and the synchronizing signal generator 152 correspond to connecting circuits in the first connecting unit and the second connecting unit.

Next, the operation according to the present embodiment will be described with reference to FIG. 1. The image input signal outputted from the camera 500 is fed to the synchronizing signal detector 142 of the image input unit 140. In the synchronizing signal detector 142, a synchronizing signal is detected from the inputted image input signal, and at the same time, effective image data that is effective in displaying the image is extracted and temporarily stored in the input buffer memory 141. Since the effective image data is sent to the input buffer memory 141 one after another, the image input unit 140 requests the second DMA controller 130 to transfer, to the frame memory 400, the effective image data that has been stored temporarily in the input buffer memory 141. Thereafter, the second DMA controller 130 transfers the effective image data continuously at top priority at the predetermined time via the second bus 102, from the input buffer memory 141 to the frame memory 400.

This data transfer is "urgent processing".

Processing of the image display on the display 600 is performed as follows. The image output unit 150 requests the second DMA controller 130 to transfer effective image data for display from the frame memory 400 to the output buffer memory 151. Thereafter, the second DMA controller 130 transfers the effective image data continuously at top priority at the predetermined time via the second bus 102, from the frame memory 400 to the output buffer memory 151.

This data transfer is "urgent processing".

After the transferred effective image data is temporarily stored in the output buffer memory 151, a synchronizing signal is inserted to the effective image data by the synchronizing signal generator 152. The insertion of the synchronizing signal is necessary to properly display the effective image data on the display 600. Thereafter, the effective image data is sent out to the display 600.

When image processing by the processor 110 is necessary for the inputted image, the effective image data that has been stored in the frame memory 400 is required to be transferred to the main memory 200. In this case, the first DMA controller 120 requests the second DMA controller 130 to transfer the effective image data. Then, the second DMA controller 130 transfers the effective image data from the frame memory 400 to the main memory 200 via the first bus 101 and the second bus 102. This data transfer is performed while data transfer from the input buffer memory 141 to the frame memory 400, and data transfer from the frame memory 400 to the output buffer memory 151 are not performed, that means during the time when no "urgent processing" is performed.

This data transfer is "normal processing".

Also when transferring effective image data, of which image has been processed, to the frame memory 400 from main memory 200, the first DMA controller 120 requests the second DMA controller 130 to transfer the effective image data, and the transfer will be performed via the first bus 101 and the second bus 102 while no "urgent processing" is performed.

This data transfer is also "normal processing".

The first DMA controller 120 and the second DMA controller 130 perform arbitration to avoid possible conflict during such data transfer, among the main memory 200, the frame memory 400, the first bus 101, and the second bus 102, as described above. The detail timing of the arbitration will be described later.

Figure 2:
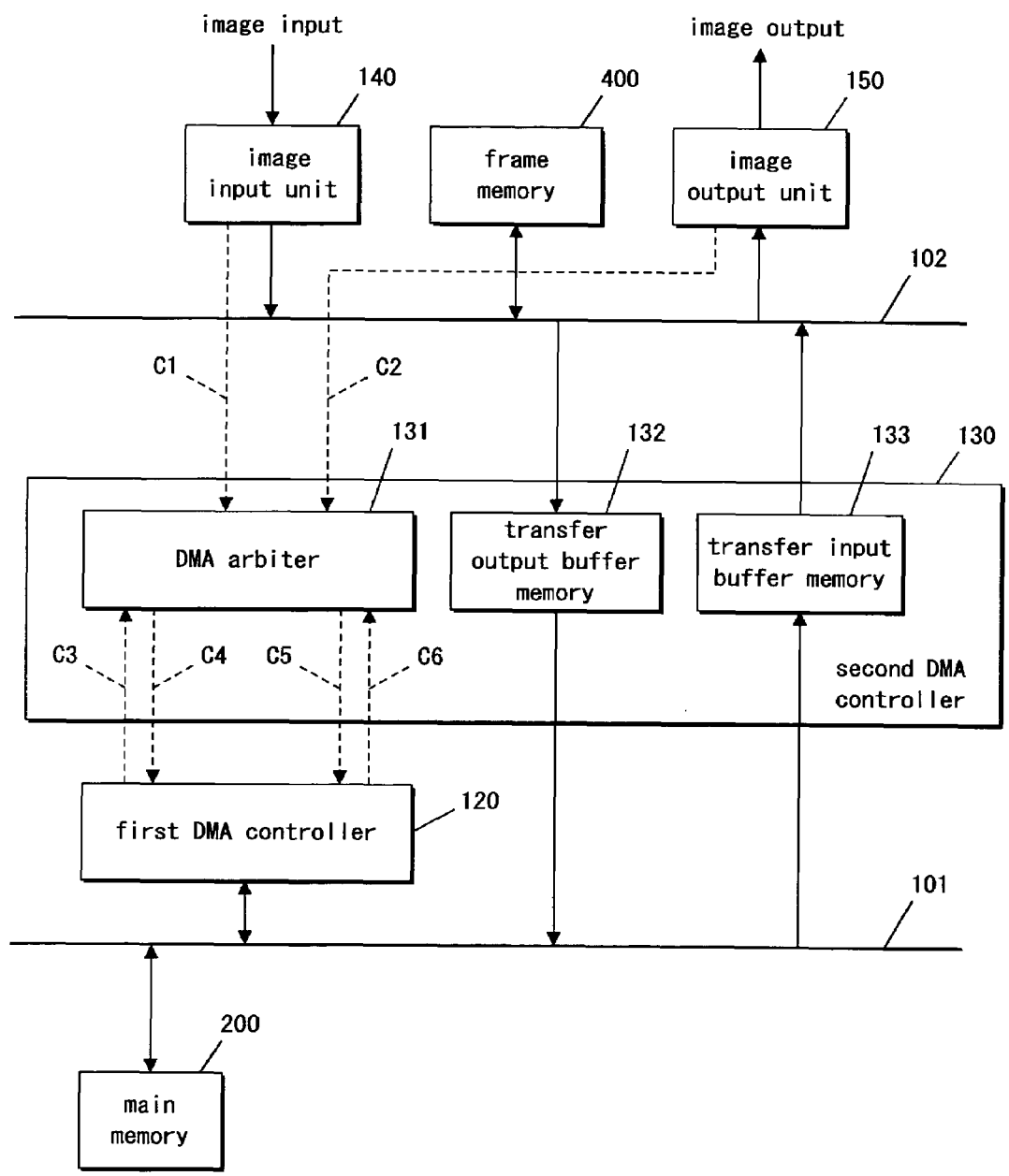
FIG. 2 is a block diagram illustrating a second DMA controller according to the first embodiment of the present invention.

FIG. 2 is a block diagram illustrating a second DMA controller according to the first embodiment of the present invention. FIG. 2 also shows, by broken lines, the control signal paths for arbitration around the second DMA controller 130. In FIG. 2, the processor 110 and the non-volatile memory 300 are not depicted. Also in FIG. 2, by attaching the same reference characters and numbers to the same elements as in FIG. 1, the pertaining explanation will be omitted.

As shown in FIG. 2, the second DMA controller 130 includes a DMA arbiter 131, a transfer output buffer memory 132, and a transfer input buffer memory 133. The input of the transfer output buffer memory 132 is connected with the second bus 102, and the output of the transfer output buffer memory 132 is connected with the first bus 101. The input of the transfer input buffer memory 133 is connected with the first bus 101, and the output of the transfer input buffer memory 133 is connected with the second bus 102.

Next, the control operation for arbitration around the second DMA controller 130 will be described with reference to FIG. 2. In this figure, control signals for the arbitration are shown by broken lines.

When effective image data is extracted and stored temporarily in the image input unit 140, the image input unit 140 issues a transfer request signal C1 to the DMA arbiter 131 of the second DMA controller 130. If "normal processing" is in progress via the second bus 102 when the transfer request signal C1 is received, the DMA arbiter 131 interrupts such normal processing, and transfers the effective image data as "urgent processing" to the frame memory 400 from the input buffer memory 141 of the image input unit 140 via the second bus 102.

The image output unit 150 issues a transfer request signal C2 to the DMA arbiter 131 of the second DMA controller 130 when the necessity of data transfer occurs. If "normal processing" is in progress via the second bus 102 when the transfer request signal C2 is received, the DMA arbiter 131 interrupts such normal processing, and transfers the effective image data as "urgent processing" to the output buffer memory 151 of the image output unit 150 from the frame memory 400 via the second bus 102.

The data transfer between the frame memory 400 and the main memory 200 is performed as follows. The first DMA controller 120 issues a transfer request signal C3 to the DMA arbiter 131 of the second DMA controller 130 to transfer effective image data, derived from the input image and stored in the frame memory 400, to the main memory 200. The DMA arbiter 131, upon receiving the transfer request signal C3, transfers the effective image data to the transfer output buffer memory 132 from the frame memory 400, while the frame memory 400 does not transfer data from the image input unit 140 or to the image output unit 150. After the completion of the transfer, the DMA arbiter 131 makes a first transfer approval signal C4 effective that is issued to the first DMA controller 120. After confirming that the first transfer approval signal C4 becomes effective, the first DMA controller 120 transfers the effective image data to the main memory 200 from the transfer output buffer memory 132.

When the transfer input buffer memory 133 is empty, the DMA arbiter 131 makes a second transfer approval signal C5 effective that is to be issued to the first DMA controller 120. After confirming that the second transfer approval signal C5 becomes effective, the first DMA controller 120 transfers effective image data to be outputted, to the transfer input buffer memory 133 from main memory 200. After the completion of the transfer, the first DMA controller 120 makes a third transfer approval signal C6 effective, and issues the third transfer approval signal C6 to the DMA arbiter 131. After confirming that the third transfer approval signal C6 becomes effective, the DMA arbiter 131 transfers the effective image data to the frame memory 400 from the transfer input buffer memory 133, while the frame memory 400 does not transfer data from the image input unit 140 or to the image output unit 150.

The detailed timing of the arbitration that the first DMA controller 120 and the second DMA controller 130 perform for the data transfer mentioned above will be described later.

Figure 3:
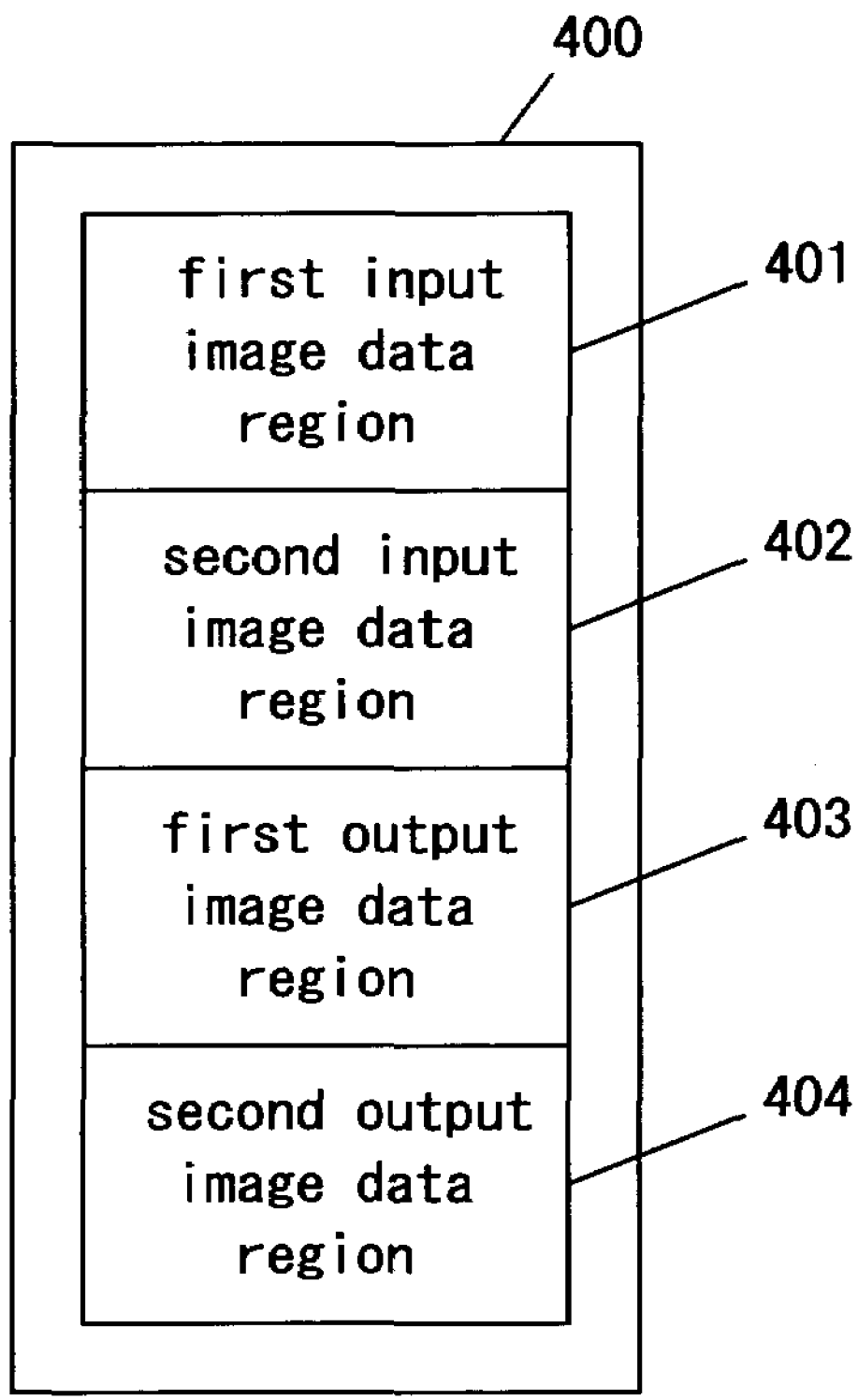
FIG. 3 is an exemplified illustration showing an allocation of a frame memory according to the first embodiment of the present invention.

FIG. 3 is an exemplified illustration showing data allocation in the frame memory 400 according to the first embodiment of the present invention. In the frame memory 400, a data storing region is divided into four regions such as a first input image data region 401, a second input image data region 402, a first output image data region 403 and a second output image data region 404.

Inputted effective image data is stored in the first input image data region 401 and the second input image data region 402 alternatively. When a data transfer request is issued from the first DMA controller 120, either of the effective image data, which has completed to be stored to the first input image data region 401 or to the second input image data region 402, is transferred. This feature makes it possible to avoid overwriting one of the input image data regions where storing has not completed, even when data is transferred between the main memory 200 and the frame memory 400 during no "urgent processing" is performed.

Regarding effective image data to be outputted, upon completion of the data transfer of the effective image data from the main memory 200 to the frame memory 400, the image output unit 150 acquires the effective image data either from the first output image data region 403 or the second output image data region 404, which has completed the data transfer earlier. Then, the image output unit 150 performs processing for display. This feature prevents image display on the display 600 from being delayed, even in the case of data transfer as "normal processing" between the main memory 200 and the frame memory 400.

Figure 4:
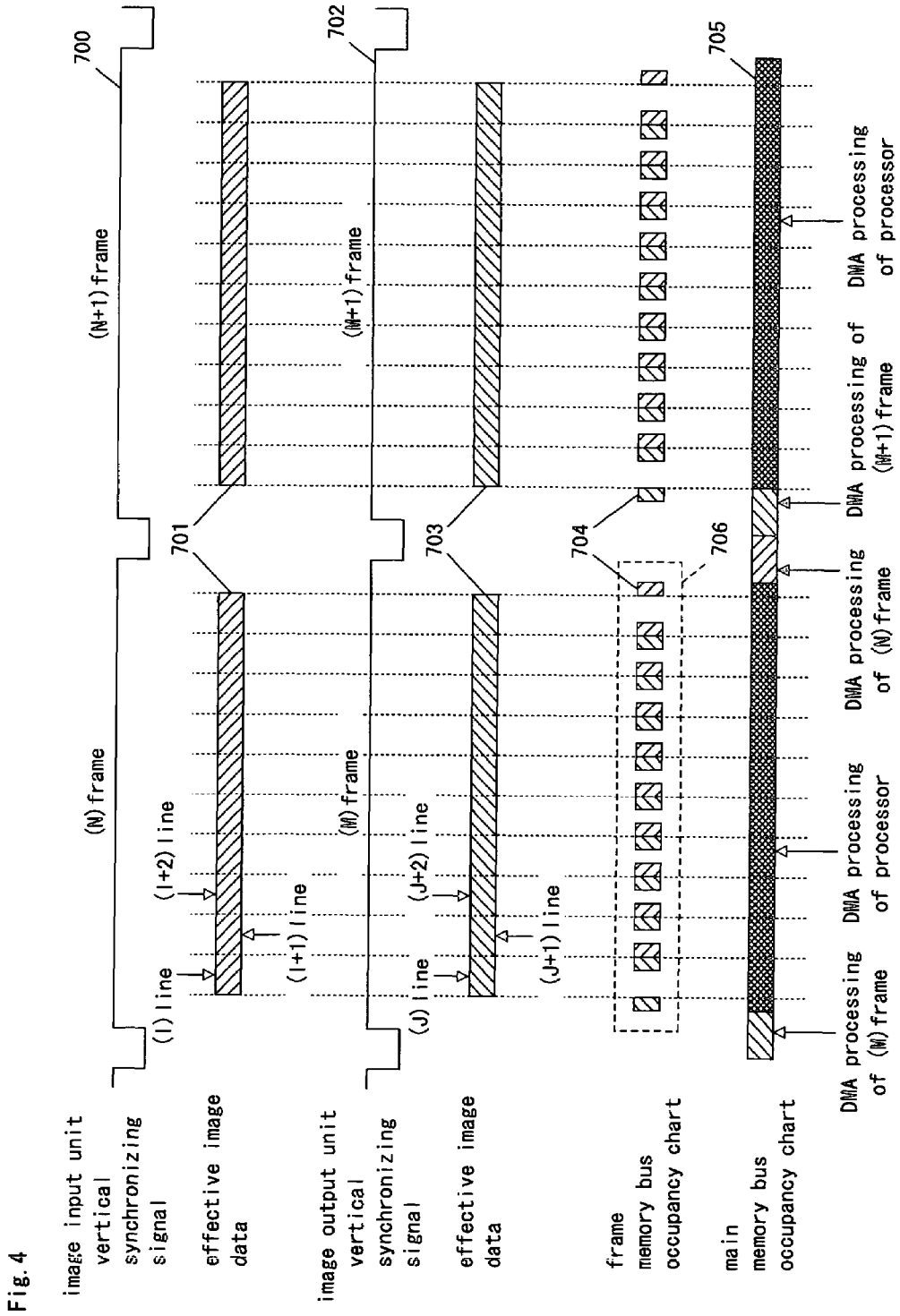
FIG. 4 is a timing chart illustrating data transfer of a main memory and a frame memory according to the first embodiment of the present invention.

FIG. 4 is a timing chart illustrating data transfer of the main memory 200 and the frame memory 400 according to the first embodiment of the present invention. FIG. 4 shows, regarding image input signal, the timing of a vertical synchronizing signal 700 (an (N) frame and an (N+1) frame are shown in FIG. 4) and effective image data 701 (similarly shown per line). The vertical synchronizing signal 700 and the effective image data 701 are extracted from the image input signal by the synchronizing signal detector 142 in FIG. 1.

FIG. 4 also shows, regarding image output signal, the timing of a vertical synchronizing signal 702 (similarly an (M) frame and an (M+1) frame are shown) and effective image data 703 (similarly shown per line). The vertical synchronizing signal 702 is to be added to the effective image data 703 by the synchronizing signal generator 152 in FIG. 1, thereby generating the image output signal.

A frame memory bus occupancy state chart 704 in FIG. 4 illustrates timing that the frame memory 400 occupies the second bus 102, when effective image data is transferred from the input buffer memory 141 to the frame memory 400, and from the frame memory 400 to the output buffer memory 151 respectively, in the image input/output device according to the present embodiment shown in FIG. 1. A part 706 is enlarged in FIG. 5 for further detail.

Figure 5:
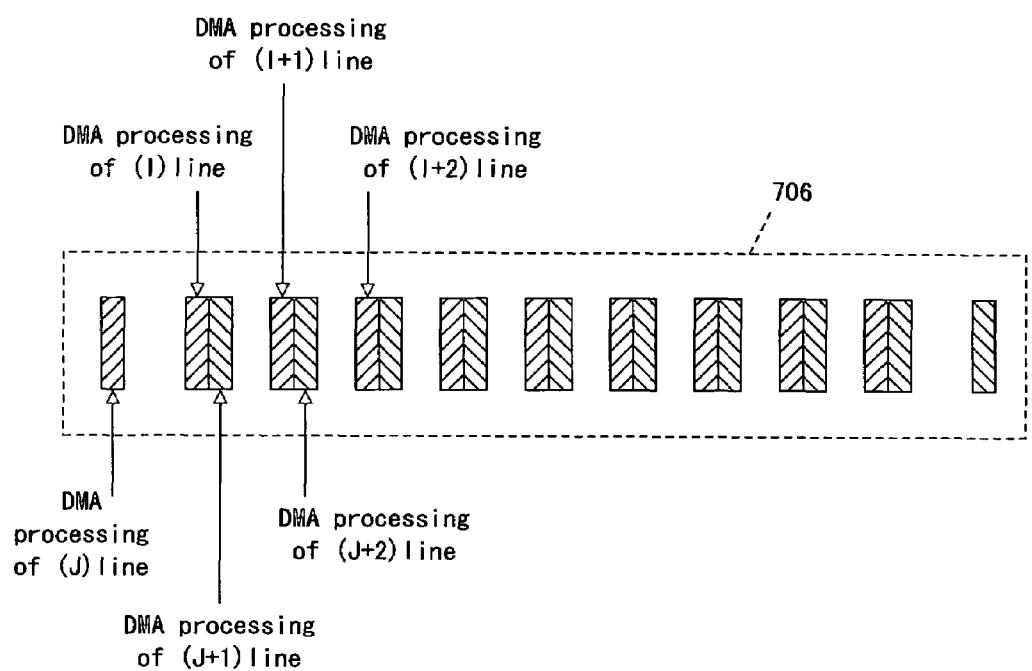
FIG. 5 is a timing chart showing data transfer between an input buffer memory and a frame memory, and data transfer between an output buffer memory and the frame memory according to the first embodiment of the present invention.

That is, FIG. 5 shows timing in data transfer between the input buffer memory 141 and the frame memory 400, and data transfer between the output buffer memory 151 and the frame memory 400, according to the first embodiment of the present invention. As shown in this figure, the data transfer as "urgent processing" by accessing to the frame memory 400 in synchronization with a horizontal synchronizing signal (not shown), is carried out in the order; DMA processing of a (J) line, an interruption, DMA processing of an (I) line, DMA processing of a (J+1) line, an interruption, DMA processing of an (I+1) line, DMA processing of a (J+2) line, and so on.

"DMA processing of the (J) line" means to transfer the effective image data of the (J) line via the second bus after accessing to the frame memory 400.

While data transfer as "urgent processing" is performed, the main memory 200 and the first bus 101 are open, wherein another processing is possible.

Next, a main memory bus occupancy state chart 705 shown in FIG. 4 illustrates timing that the main memory 200 occupies the first bus 101. That is, in synchronization with a vertical synchronizing signal 700 or 702, the following processing is performed in the order of; DMA processing of an (M) frame when the second bus 102 is not occupied by the frame memory 400, DMA processing of the processor 110 when the second bus 102 is occupied by the frame memory 400, DMA processing of an (N) frame and DMA processing of an (M+1) frame when the second bus 102 is not occupied by the frame memory 400, and so on.

"DMA processing of the (M) frame" means to transfer the effective image data of the (M) frame from the main memory 200 after accessing to the main memory 200. This effective image data becomes output image later on. "DMA processing of the processor 110" means that data transfer is performed between the processor 110 and the main memory 200.

As mentioned above, according to the present embodiment, installing the second DMA controller 130 and the second bus 102 makes it possible to separate DMA processing as "urgent processing" and "normal processing". Consequently, the interruption and resumption of "normal processing" to perform "urgent processing", which has been a problem in the prior art, does not occur. Due to this feature, scheduling of the DMA controller becomes easier and the circuit becomes simpler.

(Second Embodiment)

Figure 6:
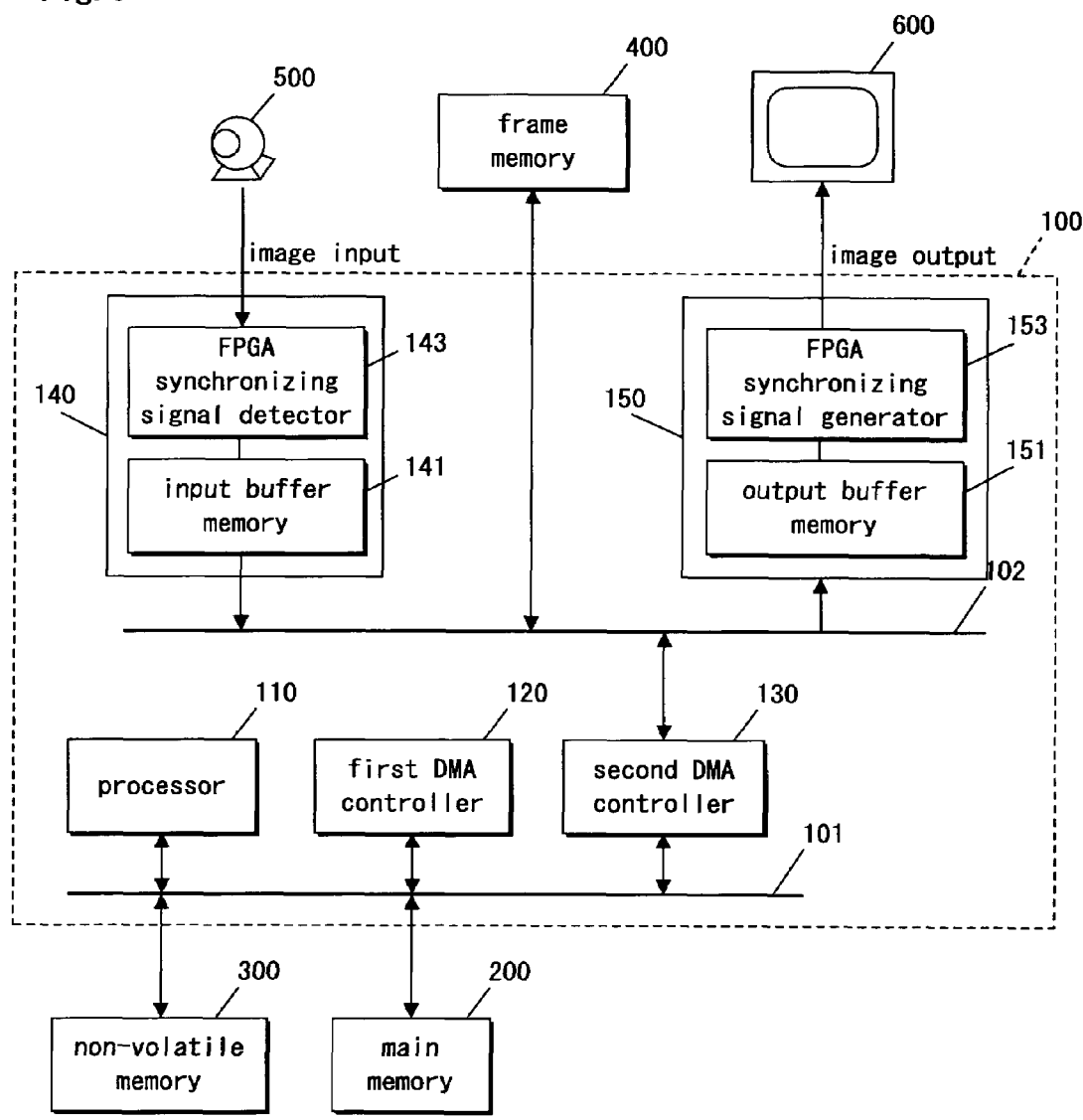
FIG. 6 is a block diagram illustrating an image input/output device according to a second embodiment of the present invention.

FIG. 6 is a block diagram illustrating an image input/output device according to a second embodiment of the present invention. In FIG. 6, by attaching the same reference characters and numbers to the same elements as in FIG. 1, the pertaining explanation will be omitted.

According to the present embodiment, an image input unit 140 possesses an FPGA synchronizing signal detector 143 and an input buffer memory 141, and an image output unit 150 possesses an FPGA synchronizing signal generator 153 and an output buffer memory 151. The FPGA synchronizing signal detector 143 and the FPGA synchronizing signal generator 153 are respectively constituted by Field Programmable Gate Array. Other elements are the same as those described in the first embodiment.

The FPGA is a reconfigurable functional element as the name shows. Accordingly, the present embodiment makes it possible to realize an image input/output device that can easily connectable to a camera or a liquid crystal, both possessing different interface specifications.

Such examples will be described below with reference to FIG. 7 and FIG. 8.

Figure 7:
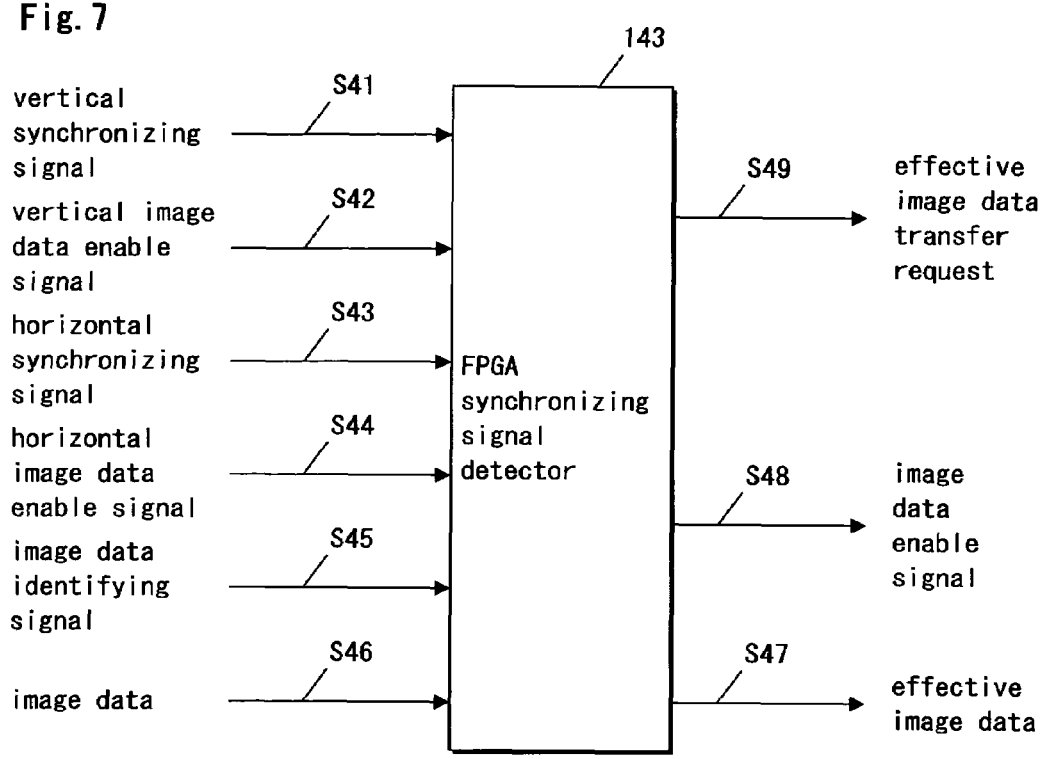
FIG. 7 is a diagrammatic illustration showing input/output relations of an FPGA synchronizing signal detector according to the second embodiment of the present invention.

FIG. 7 is a diagrammatic illustration showing input/output relations of the FPGA synchronizing signal detector 143, according to the second embodiment of the present invention. The FPGA synchronizing signal detector 143 inputs a vertical synchronizing signal S41, a vertical image data enable signal S42, a horizontal synchronizing signal S43, a horizontal image data enable signal S44, an image data identifying signal S45 and image data S46, which are outputted from a camera. While, the FPGA synchronizing signal detector 143 outputs effective image data S47, an image data enable signal S48 and an effective image data transfer request S49. The above will be explained briefly.

The image data S46 is either brightness data or chrominance data inputted from the camera, and the image data identifying signal S45 is an identifying signal showing whether the image data S46 is brightness data or chrominance data. The vertical image data enable signal S42 is a signal to indicate an effective period of the image data S46 during the vertical synchronizing signal period, and the horizontal image data enable signal S44 is a signal to indicate an effective period of the image data S46 during the horizontal synchronizing signal period.

The effective image data S47 is image data that the FPGA synchronizing signal detector 143 extracts from the input signal mentioned above and outputs to the input buffer memory 141 shown in FIG. 6. The image data enable signal S48 is a signal to indicate a period that the effective image data S47 is present. The effective image data transfer request S49 is a signal that the FPGA synchronizing signal detector 143 requests the second DMA controller 130 shown in FIG. 6 to transfer the effective image data from the input buffer memory 141 to the frame memory 400.

Figure 8:
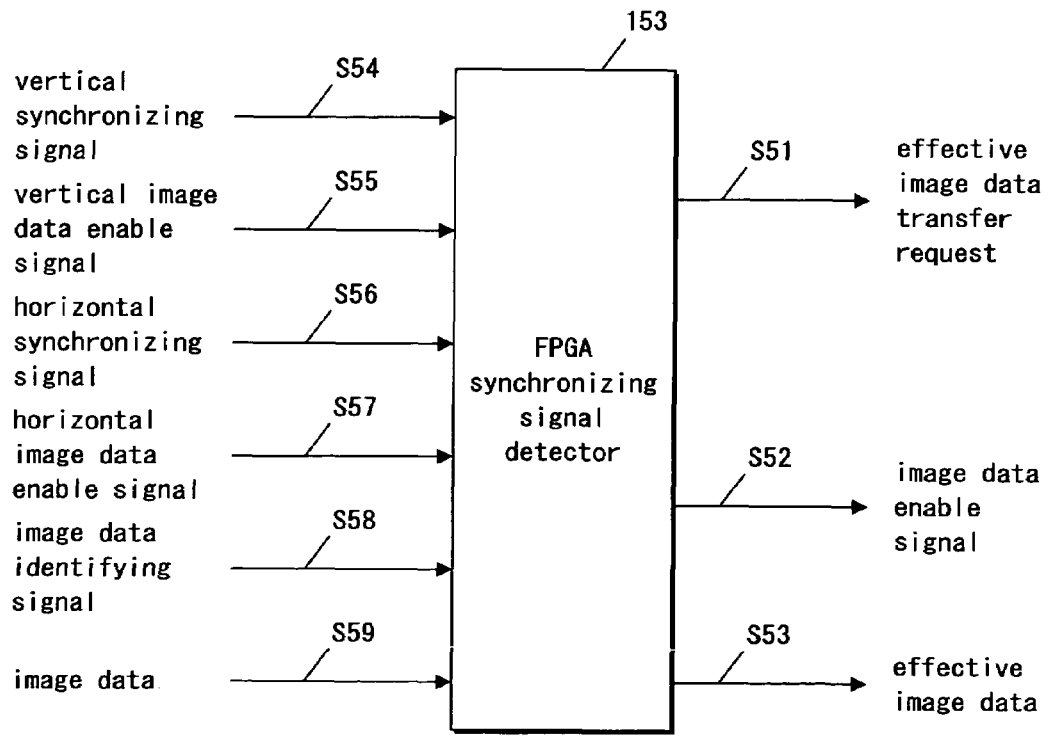
FIG. 8 is a diagrammatic illustration showing input/output relations of an FPGA synchronizing signal generator according to the second embodiment of the present invention.

FIG. 8 is a diagrammatic illustration showing input/output relations of the FPGA synchronizing signal generator 153, according to the second embodiment of the present invention. The FPGA synchronizing signal generator 153 outputs an effective image data transfer request S51 to be sent to the second DMA controller 130 shown in FIG. 6, and inputs effective image data S53 inputted from the output buffer memory 151 shown in FIG. 6, and an image data enable signal S52. Furthermore, the FPGA synchronizing signal generator 153 outputs a vertical synchronizing signal S54, a vertical image data enable signal S55, a horizontal synchronizing signal S56, a horizontal image data enable signal S57, an image data identifying signal S58 and image data S59, to the image display device 600 shown in FIG. 6. The above will be explained briefly.

The effective image data transfer request S51 is a transfer request signal of effective image data that the FPGA synchronizing signal generator 153 sends to the second DMA controller 130 shown in FIG. 6. The effective image data S53 is effective image data inputted from the output buffer memory 151 on receipt of the transfer request, while the image data enable signal S52 is a signal to indicate a period that the effective image data is present. The image data S59 is either of brightness data, chrominance data, red data, green data or blue data that are outputted to the image display device 600. The image data identifying signal S58 is a signal to identify that the image data S59 to be outputted is either of the brightness data, the chrominance data, the red data, the green data or the blue data.

A combination of the input signals from the camera 500 and the output signals to the image display device 600 shown in FIG. 7 and FIG. 8 is one example. Accordingly, the combination of the input signals and the output signals mentioned above is different when a camera and/or an image display device have other specifications. The FPGA synchronizing signal detector 143 and the FPGA synchronizing signal generator 153 according to the present invention can cope with such situations by configuring a necessary circuit with an FPGA.

Therefore, according to the present embodiment, by configuring a synchronizing signal generator of an image input unit 140, and a synchronizing signal generator of an image output unit 150 by an FPGA, it is possible to provide an image input/output device that is easily connectable to a camera and/or an image display device with different interfaces. Thereby, it becomes possible to shorten the development period and reduce the cost.

(Third Embodiment)

Figure 9:
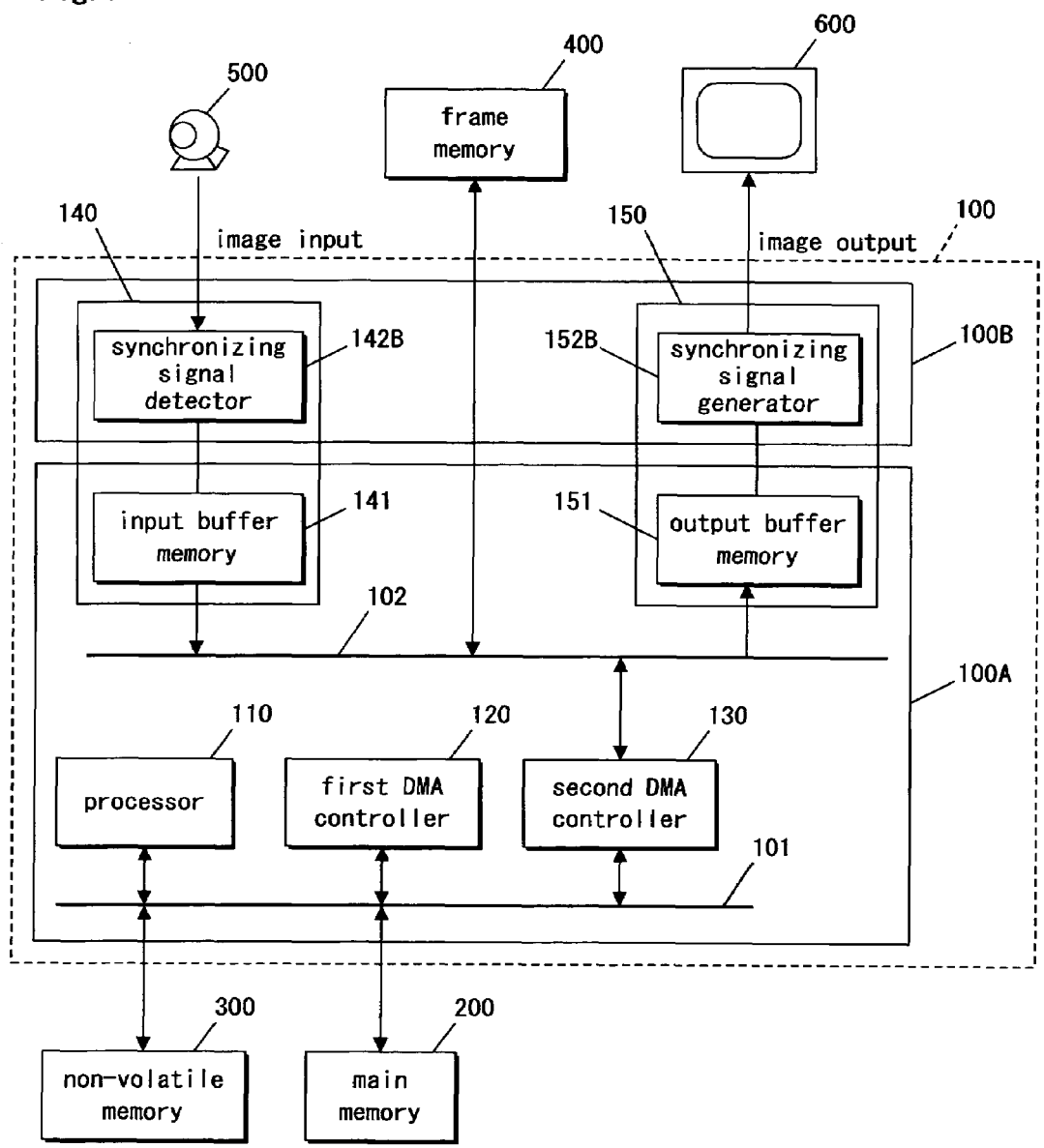
FIG. 9 is a block diagram illustrating an image input/output device according to a third embodiment of the present invention.
Figure 10:
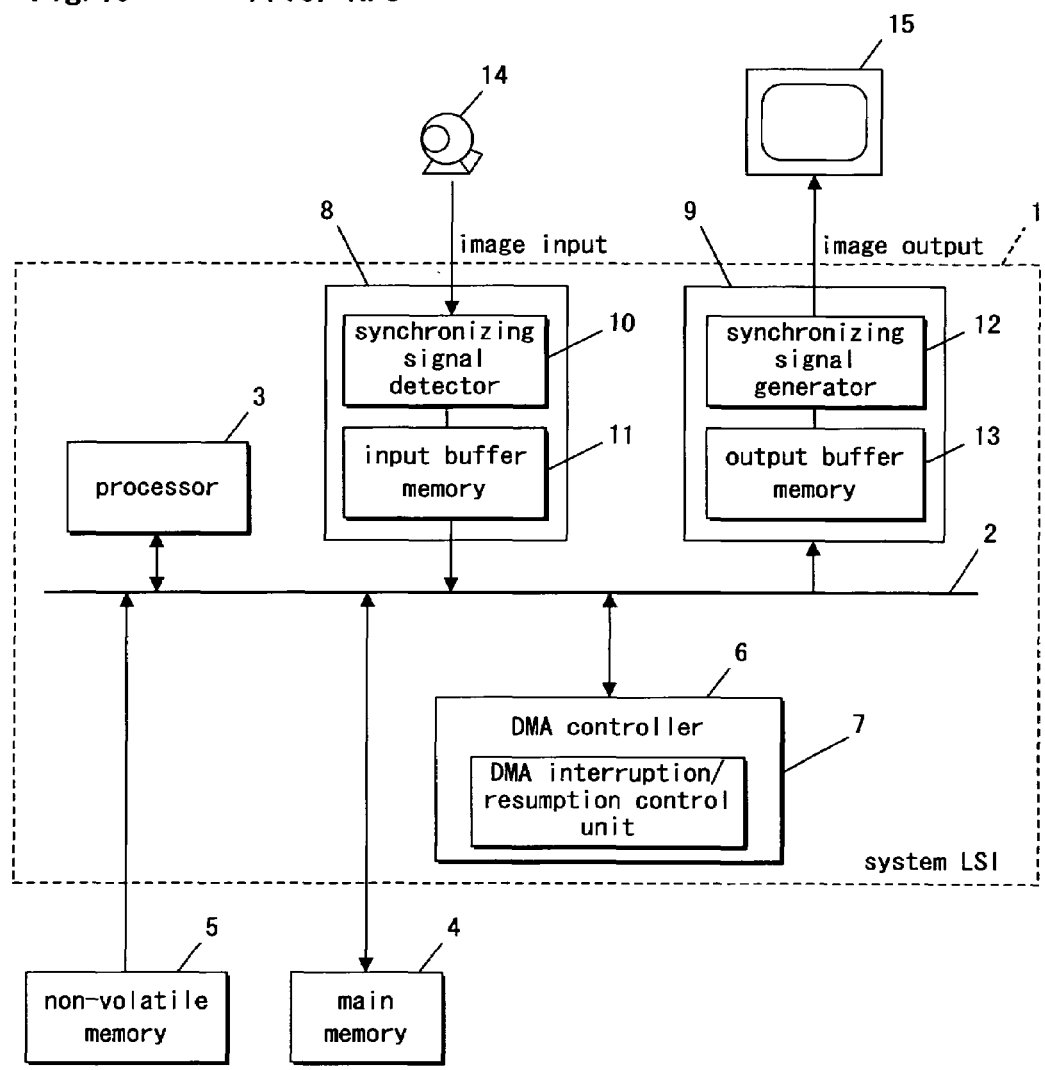
FIG. 10 is a block diagram illustrating a system LSI 1 for image processing and an image input/output device utilizing the system LSI 1, according to an prior art.
Figure 11:
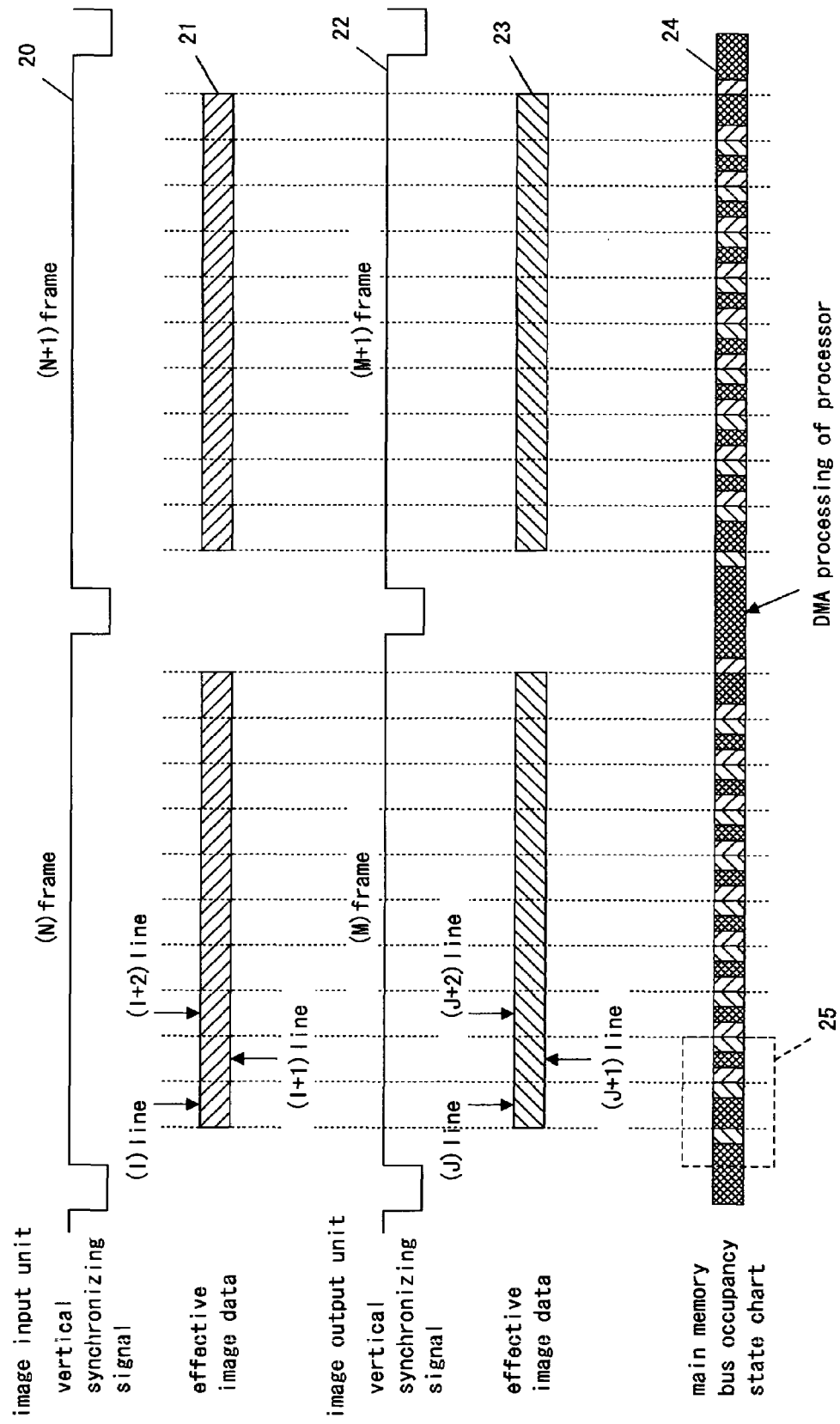
FIG. 11 is a chart exemplifying DMA timing of a system LSI for image processing according to the prior art.
Figure 12:
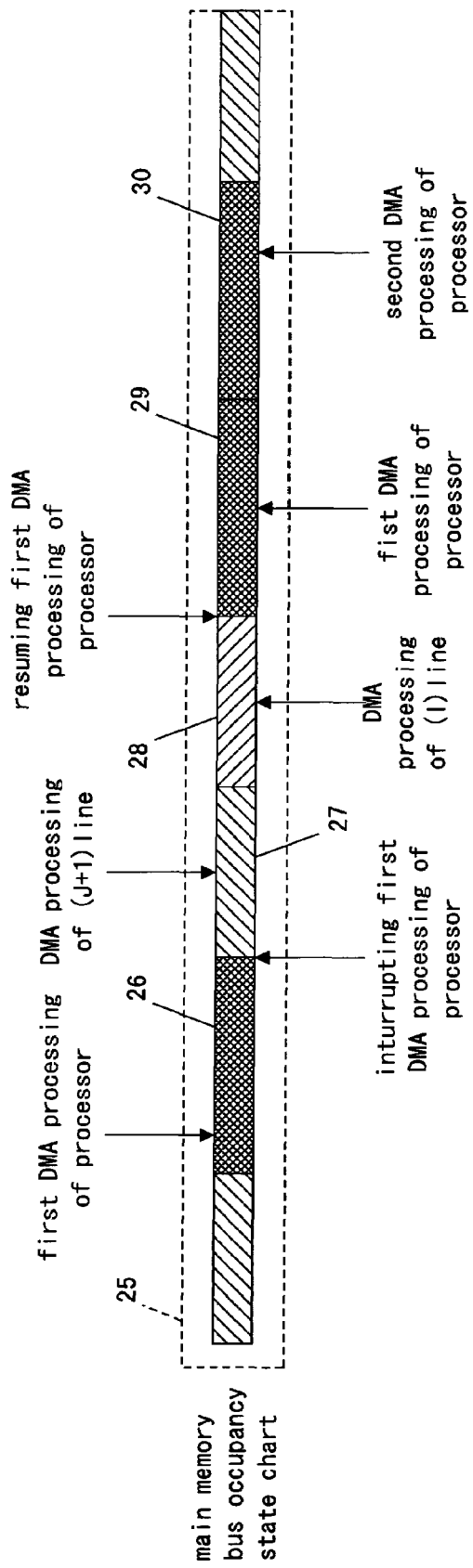
FIG. 12 is an enlarged chart of DMA timing of the system LSI 1 for image processing according to the prior art.

FIG. 9 is a block diagram illustrating an image input/output device according to a third embodiment of the present invention. In FIG. 9, by attaching the same characters and numbers to the same elements as in FIG. 1, the pertaining explanation will be omitted.

In FIG. 9, the circuit block diagram and the operation of the image input/output device are the same as those in FIG. 1, with the exception of a state of chip integration.

That is, according to the present embodiment, an integrated circuit 100 is divided into a first integrated circuit 100A and a second integrated circuit 100B. A synchronizing signal detector 142B of an image input unit 140, and a synchronizing signal generator 152B of an image output unit 150 are provided in the second integrated circuit 100B, while other elements are provided in the first integrated circuit 100A. The output of the synchronizing signal detector 142B in the second integrated circuit 100B is connected with an input buffer memory 141 of the image input unit 140 in the first integrated circuit 100A, while the input of the synchronizing signal generator 152B in the second integrated circuit 100B is connected with an output buffer memory 151 of the image output unit 150 in the first integrated circuit 100A. The integrated circuit 100 comprising the first integrated circuit 100A and the second integrated circuit 100B is fabricated in one package.

The camera 500 is connected with the synchronizing signal detector 142B of the second integrated circuit 100B, while the image display device 600 is connected with the synchronizing signal generator 152B of the second integrated circuit 100B. The non-volatile memory 300 and the main memory 200 are connected with the first bus 101 of the first integrated circuit 100A, while the frame memory 400 is connected with the second bus 102 of the first integrated circuit 100A.

The operation of the image input/output device fabricated in the above-mentioned arrangement according to the present embodiment is completely the same as the first embodiment shown in FIG. 1.

However, according to the present embodiment, for example, in order to be connectable to a camera and/or an image display device with different interfaces, it is necessary to newly develop only the second integrated circuit 100B possessing the synchronizing signal detector 142B and the synchronizing signal generator 152B. It is possible to utilize the first integrated circuit 10A, possessing most of the elements, as it is. Accordingly, an image input/output device with a new interface can be developed in a short period of time, which reduces the cost.

According to the present embodiment explained above, the image input/output device possesses a single processor 110. However, the number of the processor is not limited to one. To install a plurality of processors makes more complicated or faster processing possible.

The present invention is not only applicable to an image input/output device possessing an image input and an image output, but also applicable to an audio-visual device possessing a first connecting unit as an image input (or output), and a second connecting unit as an audio input (or output). The present invention is also applicable as an audio input/output device possessing an audio input and an audio output.

The intention of the present invention is to provide a second DMA controller and a second bus to avoid possible conflict of data transfer in a bus, therefore the scope of the present invention is not limited to the embodiments mentioned above.

According to the present invention, possible conflict in transferring image data as "urgent processing" and image data as "normal processing" can be avoided. Also the present invention can provide an image input/output device possessing an interface that is easily connectable to an image input device and an image display device with different specifications by introducing a reconfigurable FPGA.

Furthermore, by fabricating a connecting circuit of the interface in another interface integrated circuit separated from the main integrated circuit, it becomes easier to meet with an image input device and an image display device with different specifications. In this case, only the interface integrated circuit is needed to be redesigned, however, the main integrated circuit can be used as it is, without redesigning.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An integrated circuit comprising:
   a first bus;
   a processor operable to connect with said first bus;
   a first DMA controller operable to connect with said first bus;
   a second bus;
   a second DMA controller operable to mutually connect said first bus and said second bus;
   a first connecting unit comprising a first buffer memory and operable to connect with said second bus; and
   a second connecting unit comprising a second buffer memory and operable to connect with said second bus,
   wherein said first bus is further operable to connect with a first memory that is externally installed and accessible by said processor, said second bus is further operable to connect with a second memory that is externally installed,
   wherein said first DMA controller is operable to arbitrate data transfer between said first memory and said second memory, after requesting said second DMA controller, and
   wherein said second DMA controller is operable to arbitrate data transfer between said second memory and said first buffer memory and data transfer between said second memory and said second buffer memory.

2. An integrated circuit as defined in claim 1, wherein said second DMA comprises a DMA arbiter, a transfer output buffer memory and a transfer input buffer memory,
   wherein said DMA arbiter, upon receipt of data transfer request from said first connecting unit, arbitrates data transfer between said first buffer memory and said second memory via said second bus,
   wherein said DMA arbiter, upon receipt of data transfer request from said second connecting unit, arbitrates data transfer between said second buffer memory and said second memory via said second bus,
   wherein said DMA arbiter, upon receipt of data transfer request from said first DMA controller, arbitrates data transfer from said second memory to said first memory via said transfer output buffer memory, and
   wherein said DMA arbiter, upon receipt of data transfer request from said first DMA controller, arbitrates data transfer from said first memory to said second memory via said transfer input buffer memory.

3. An integrated circuit as defined in claim 1, wherein said first connecting unit further comprises a connecting circuit that interfaces an external device connected to said first connecting unit with said first buffer memory, and
   wherein said second connecting unit further comprises a connecting circuit that interfaces an external device connected to said second connecting unit with said second buffer memory.

4. An integrated circuit as defined in claim 3, wherein said first connecting unit is an image input unit that includes a synchronizing signal detector as said connecting circuit, detects effective image data from an externally inputted image signal, and stores the effective image data to said first buffer memory, and
   wherein said second connecting unit is an image output unit that includes a synchronizing signal generator as said connecting circuit, generates image output signal by inserting a synchronizing signal to image data stored in said second buffer memory, and sends externally the image output signal.

5. An integrated circuit as defined in claim 1, wherein said connecting circuit of said first connecting unit and said connecting circuit of said second connecting unit are composed of an FPGA.

6. An integrated circuit as defined in claim 1, wherein said processor is substituted by a plurality of processors.

7. An image input/output device comprising: an integrated circuit; a first memory; and a second memory,
   the integrated circuit comprising:
   a first bus;
   a processor operable to connect with said first bus;
   a first DMA controller operable to connect with said first bus;
   a second bus;
   a second DMA controller operable to mutually connect said first bus and said second bus;
   a first connecting unit comprising a synchronizing signal detector and a first buffer memory and operable to connect with said second bus; and a second connecting unit comprising a synchronizing signal generator and a second buffer memory and operable to connect with said second bus, wherein said synchronizing signal detector of said first connecting unit detects effective image data from an externally inputted image signal, and stores the effective image data to said first buffer memory, wherein said synchronizing signal generator generates image output signal by inserting a synchronizing signal to image data stored in said second buffer memory, and sends externally the image output signal, the first memory being operable to connect with said first bus and accessible by said processor and said first DMA controller, and the second memory being operable to connect with said second bus and accessible by said second DMA controller, wherein said first DMA controller arbitrates data transfer between said first memory and said second memory, after requesting said second DMA controller, and wherein said second DMA controller arbitrates data transfer between said second memory and said first buffer memory and data transfer between said second memory and said second buffer memory.

8. An image input/output device as defined in claim 7, wherein said second DMA comprises a DMA arbiter, a transfer output buffer memory and a transfer input buffer memory, wherein said DMA arbiter, upon receipt of data transfer request from said first connecting unit, arbitrates data transfer between said first buffer memory and said second memory via said second bus, wherein said DMA arbiter, upon receipt of data transfer request from said second connecting unit, arbitrates data transfer between said second buffer memory and said second memory via said second bus, wherein said DMA arbiter, upon receipt of data transfer request from said first DMA controller, arbitrates data transfer from said second memory to said first memory via said transfer output buffer memory, wherein said DMA arbiter, upon receipt of data transfer request from said first DMA controller, arbitrates data transfer from said first memory to said second memory via said transfer input buffer memory.

9. An image input/output device as defined in claim 7, wherein said synchronizing signal detector of said first connecting unit and said synchronizing signal generator in said second connecting unit are respectively composed of an FPGA.

10. An image input/output device as defined in claim 7, wherein said processor is substituted by a plurality of processors.

11. An image input/output device comprising: a first integrated circuit; a second integrated circuit; a first memory; and a second memory, the first integrated circuit comprising:
a first bus;
a processor operable to connect with said first bus;
a first DMA controller operable to connect with said first bus;
a second bus;
a second DMA controller operable to mutually connect said first bus and said second bus;
a first buffer memory operable to connect with said second bus; and a second buffer memory operable to connect with said second bus;

the second integrated circuit comprising a synchronizing signal detector and a synchronizing signal generator;

the first memory being operable to connect with said first bus and accessible by said processor and said first DMA controller; and the second memory operable to connect with said second bus and accessible by said second DMA controller, wherein said synchronizing signal detector and said first buffer memory are mutually connected to form a first connecting unit, wherein said synchronizing signal generator and said second buffer memory are mutually connected to form a second connecting unit, wherein said synchronizing signal detector detects effective image data from an externally inputted image signal, and stores the effective image data to said first buffer memory, wherein said synchronizing signal generator generates image output signal by inserting a synchronizing signal to image data stored in said second buffer memory, and sends externally the image output signal, wherein said first DMA controller arbitrates data transfer between said first memory and said second memory through said second DMA controller, wherein said second DMA controller arbitrates data transfer between said second memory and said first buffer memory and data transfer between said second memory and said second buffer memory.

12. An image input/output method utilizing an image input/output device, the image input/output device including: a first bus; a processor operable to connect with the first bus; a first DMA controller operable to connect with the first bus; a second bus; a second DMA controller operable to mutually connect the first bus and the second bus; a first connecting unit including a synchronizing signal detector and a first buffer memory and operable to connect with the second bus; and a second connecting unit including a synchronizing signal generator and a second buffer memory and operable to connect with the second bus, a first memory connected to the first bus and accessible by the processor and the first DMA controller, and a second memory connected to the second bus and accessible by the second DMA controller, the image input/output method comprising:

detecting effective image data from an externally inputted image signal by the synchronizing signal detector of the first connecting unit and storing the effective image data to said first buffer memory;

generating image output signal by inserting a synchronizing signal to image data stored in said second buffer memory, and sending externally the image output signal;

arbitrating, by the second DMA controller, data transfer between the second memory and the first buffer memory and data transfer between the second memory and the second buffer memory; and arbitrating, by the first DMA controller, data transfer between the first memory and the second memory through the second DMA controller.

13. An image input/output method utilizing an image input/output device, the image input/output device including: a first bus; a processor operable to connect with the first bus; a first DMA controller operable to connect with the first bus; a second bus;

a second DMA controller including a DMA arbiter and a transfer output buffer memory and a transfer input buffer memory, the second DMA controller being operable to mutually connect the first bus and the second bus; a first connecting unit including a synchronizing signal detector and a first buffer memory and operable to connect with the second bus; and a second connecting unit including a synchronizing signal generator and a second buffer memory and operable to connect with the second bus, a first memory connected to the first bus and accessible by the processor and the first DMA controller, and a second memory connected to the second bus and accessible by the second DMA controller, the image input/output method comprising:

arbitrating, by the DMA arbiter upon receipt of data transfer request from the first connecting unit, data transfer between the first buffer memory and the second memory via the second bus;

arbitrating, by the DMA arbiter upon receipt of data transfer request from the second connecting unit, data transfer between the second buffer memory and the second memory via the second bus;

arbitrating, by the DMA arbiter upon receipt of data transfer request from the first DMA controller, data transfer from the second memory to the first memory via the transfer output buffer memory; and arbitrating, by the DMA arbiter upon receipt of data transfer request from the first DMA controller, data transfer from the first memory to the second memory via the transfer input buffer memory.

* * * * *